United States Patent
Taborelli

(10) Patent No.: US 10,680,495 B2
(45) Date of Patent: Jun. 9, 2020

(54) LINEAR SHAFT MOTOR

(71) Applicant: Agie Charmilles SA, Losone (CH)

(72) Inventor: Marco Taborelli, Villa Guardia (IT)

(73) Assignee: Agie Charmilles SA, Losone (CH)

( * ) Notice: Subject to any disclaimer, the term of this patent is extended or adjusted under 35 U.S.C. 154(b) by 248 days.

(21) Appl. No.: 15/790,600

(22) Filed: Oct. 23, 2017

(65) Prior Publication Data

US 2018/0138783 A1 May 17, 2018

(30) Foreign Application Priority Data

Nov. 11, 2016 (EP) ..................................... 16198315

(51) Int. Cl.
| | | |
|---|---|---|
| *H02K 5/20* | (2006.01) | |
| *H02K 9/10* | (2006.01) | |
| *H02K 9/22* | (2006.01) | |
| *H02K 41/03* | (2006.01) | |
| *B23H 11/00* | (2006.01) | |
| *H02K 9/19* | (2006.01) | |

(52) U.S. Cl.
CPC ................. *H02K 9/10* (2013.01); *H02K 5/20* (2013.01); *H02K 9/22* (2013.01); *H02K 41/031* (2013.01); *B23H 11/003* (2013.01); *H02K 9/19* (2013.01)

(58) Field of Classification Search
CPC .. H02K 5/20; H02K 9/10; H02K 9/19; H02K 9/22; H02K 41/02
See application file for complete search history.

(56) References Cited

U.S. PATENT DOCUMENTS

| 6,040,642 A | 3/2000 | Ishiyama | |
|---|---|---|---|
| 6,184,596 B1 * | 2/2001 | Ohzeki | .................... F16C 29/00 |
| | | | 310/12.06 |
| 6,323,567 B1 * | 11/2001 | Hazelton | .................. H02K 9/19 |
| | | | 310/12.29 |
| 7,939,974 B2 * | 5/2011 | Chao | ....................... H02K 41/03 |
| | | | 310/12.29 |

(Continued)

FOREIGN PATENT DOCUMENTS

| CN | 200956544 Y | 10/2007 |
|---|---|---|
| CN | 201608596 U | 10/2010 |

(Continued)

OTHER PUBLICATIONS

Extended European Search Report dated Jan. 20, 2017 regarding EP Application No. 16198315.0 (8 pages).

*Primary Examiner* — Dang D Le
(74) *Attorney, Agent, or Firm* — Harness, Dickey & Pierce, P.L.C.

(57) ABSTRACT

A linear shaft motor (1) has a slider (10) and a tubular magnetic shaft (30). The slider (10) includes an oblong cuboid shaped motor housing (101) having a rectangular cross-section with a longitudinal central bore (180). The motor housing (101) includes at least two longitudinal cooling holes (161, 162, 163, 164, 165, 166, 167, 168) which are part of an integrated fluid cooling circuit. The at least two longitudinal cooling holes (161-168) are distributed symmetrically at a left and at a right side of the central bore (180), whereas the central axis (15) of any of the longitudinal cooling holes (161-168) lays below the topmost portion (20) of the central bore (180) and above the lowermost portion (25) of the central bore (180).

15 Claims, 9 Drawing Sheets

(56) References Cited

U.S. PATENT DOCUMENTS

| | | | | |
|---|---|---|---|---|
| 8,097,987 | B2* | 1/2012 | Chao | H02K 41/03 |
| | | | | 310/12.02 |
| 2002/0113506 | A1* | 8/2002 | Wong | H02K 5/15 |
| | | | | 310/89 |
| 2009/0195089 | A1 | 8/2009 | Huang et al. | |
| 2011/0198946 | A1* | 8/2011 | Koshimoto | H02K 41/02 |
| | | | | 310/12.29 |
| 2016/0301287 | A1* | 10/2016 | Nagata | H02K 41/031 |

FOREIGN PATENT DOCUMENTS

| | | |
|---|---|---|
| CN | 103683797 A | 3/2014 |
| JP | S63-2626 A | 7/1998 |
| TW | M505992 U | 8/2015 |
| WO | WO-2009-025162 A1 | 2/2009 |
| WO | WO-2010-049969 A2 | 7/2010 |
| WO | WO-2016-025975 A1 | 2/2016 |

\* cited by examiner

LINEAR SHAFT MOTOR

CROSS-REFERENCE TO RELATED APPLICATIONS

This application claims the benefit and priority of EP 16 198 315.0, filed Nov. 11, 2016. The entire disclosure of the above application is incorporated herein by reference.

TECHNICAL FIELD

The invention relates generally to a linear shaft motor, and more specifically, to a liquid cooled linear shaft motor for use with high accuracy machine tools.

BACKGROUND

Linear motors (LM) are used with machine tools since many years, in particular with milling machines, where the high acceleration and high speed achieved, and the fact that no maintenance is needed, are a great plus for the process compared with conventional systems in which rotatory motion is converted in a linear motion by means of a ball screw. LM's have also been proposed for use with Electric Discharge Machines (EDM) since more than 30 years (cp. JP63002626A). Electric discharge machines by Sodick are equipped with linear motor drive systems since 1999, only a few years after the introduction with milling machines.

A major issue of flat linear motors and one of the reasons why they have not replaced conventional systems is the strong magnetic attraction force between the iron core of primary part and permanent magnets (secondary), which has to be absorbed by adequate design of the machine structure. This force can be neutralized by a symmetric constitution of the motor itself, as with the U-channel type linear motor, or by symmetric collocation of motors within the machine.

More recently another well-known type of linear motor has been introduced as actuator for machine tools: the linear shaft motor (hereinafter referred to as LSM). Compared with other types of linear motors, LSM have a number of advantages which make them a very attractive solution for the axis actuation in certain machines. In particular the symmetric constitution leads intrinsically to balanced forces. The structural components of the machine are thus loaded essentially in the desired axial direction (thrust direction), like traditional ball screw transmissions, and structural components do not need to be as stiff as for flat LM's.

The shaft consists mainly in a row of permanent magnets producing a strong magnetic field. With the cylindrical constitution of the shaft, the entire cylindrical surface area of magnets can be used to produce thrust. A possible design of the shaft is shown in U.S. Pat. No. 6,040,642 assigned to GMC Co. Ltd. Ironless LSM provide very smooth velocity and position control, and are very energy efficient.

The LSM is preassembled, so that the mounting on the machine is comparably easy. Also, the compact symmetric constitution of the linear shaft motor is beneficial to its integration with machine tools; the motor is mounted in close relation to the respective machine component achieving excellent stiffness in force transmission. However, since the LSM is such directly linked to the respective machine component, at the core of the machine structure, the heat produced in the motor forcer must be evacuated as good as possible to avoid elongation and deformation of the machine structure and consequently a loss of accuracy.

The heating power due to ohmic losses in the copper windings is proportional to $I^2 \times R$. In normal operation, the heat generated continuously by each LSM in the range considered herein is in the order of several hundred watts. It is to be noted that normal operation is a quasi-permanent condition. Generally a CNC machine tool comprises at least three axis motors, whereas a wire electric discharge machine comprises typically two horizontal axis pairs, and a fifth vertical axis which employs rotary actuation. It goes without saying that the heat immission at the core of the machine structure has to be avoided or at least limited. With the ever more challenging accuracy requirements of machine tools, the heat immission must be intercepted at the source.

Patent document WO2010049969 assigned to Mitsubishi refers to a linear shaft motor equipped with a liquid cooling system comprising a cooling plate (motor coil holder 14) between the motor case and the machine body and two lateral cooling plates. However this cooling concept does not effectively protect the machine body, since a heat transfer to the attachment surface is not avoided. Also the insertion of such plates around and especially above the motor body increases the size of the slider, and the required volume within the machine tool.

In 2012 company Mitsubishi has launched a new series of WEDM (MV-series) using linear shaft motors. Here the problem of heat evacuation has been solved essentially by collocating some cooling plates around the LSM. Of course the height of the LSM with the cooling plates increases significantly.

Patent document U.S. Pat. No. 6,323,567 assigned to Nikon relates to a circulating system for cooling the coil array of shaft-type linear motor, by which the outside surface of the motor is maintained at a set temperature during operation. The coil housing is used to support the coil assembly and provide a fluid passageway to cool the coil assembly. The fluid passageways are distributed around the coils. The coil housing comprises an end section at each end, with fluid inlets/outlets on top of these end sections. The overall size of the shaft-type linear motor by Nikon increases substantially to fit the cooling circuit in the coil housing.

Patent document WO2016025975 assigned to Anca refers to a linear motor, including a mover having a cylindrical body with the coils inside said cylindrical body. The slider has a flange at one end by which the linear motor is securely and easily fixed in the respective machine component. A substantially coolant space is formed between the cylindrical body and the mover housing. Such design requires a considerable space between the moving parts.

Above mentioned cooling circuits are effective, however there is an important limitation, that the cross section of the motor is increased substantially in all directions. In fact the cooling circuits most generally consist in a jacket which is put around the heat source. The size of the motor increases, which in certain cases represents an unacceptable machine design limitation.

The utility model TWM505992U assigned to Excetek displayed in FIG. 1 discloses a WEDM using linear shaft motors. Here the main topic is the implementation of the good rules of mechanical engineering. Here the slider of the LSM is fixedly mounted on a structural component of the machine via its top surface. One thing that is visible here is, that the height of the slider is relevant for its integration between machine parts.

Thus, there is a need for an optimized LSM for high accuracy applications, having smaller size, and particularly a smaller height but an excellent performance and efficient cooling. To take full advantage of the strengths of a LSM in view of best accuracy of the machine tool in which the LSM is used, it is necessary to provide an integrally optimized design.

SUMMARY

A first aspect of the present invention relates to a linear shaft motor with a slider having an integrated fluid cooling designed to achieve a minimal slider construction height.

In particular, the linear shaft motor according the present invention comprises a tubular magnetic shaft and a slider, the slider comprising an oblong mainly cuboid shaped monolithic motor housing having a rectangular cross-section and low construction height Hh, i.e. low profile cross-section. The slider further comprises an integrated fluid cooling circuit. The motor housing has a longitudinal central bore in which a row of coils composing a 3-phase winding are located. The motor housing comprises at least two longitudinal cooling holes which are a part of the integrated fluid cooling circuit. The longitudinal cooling holes are distributed symmetrically at the left and right side of the central bore and parallel thereto, and the central axis of any longitudinal cooling hole lays below the topmost portion of the central bore and above the lowermost portion of the central bore, or both. In particular, the longitudinal cooling holes are not located straight above nor below the axis of central bore, nor in proximity of that position.

In this way the construction height (Hh) of the cuboid shaped motor housing is essentially determined by the size of the coils and not by the position of the longitudinal cooling holes. A minimal construction height of the motor housing and hence a minimal construction height of the entire slider is achieved therewith.

A second aspect of the invention relates to a linear shaft motor, with a slider having an integrated fluid cooling circuit, the slider comprising a motor housing comprising at least two longitudinal cooling holes, and two flanges comprising a number of interconnection holes by which the longitudinal cooling holes of the motor housing are interconnected. In this way the entire length of the motor housing is used for the heat transfer and number of machining operations at the motor housing is reduced.

A third aspect of the present invention relates to the slider of the linear shaft motor, which is mounted to a structural component of the machine tool at an upper or at a lower surface of the cuboid shaped motor housing. The motor housing comprises an oblong recessed channel at the upper and/or at the lower surface, straight above or below the axis of central bore. Further an insulating pad mounted between said motor housing and the structural component may be included.

In this way the transfer of the heat from slider to structural component of the machine is greatly reduced at least in area the straight above or below the axis of central bore, comprising the coils.

A fourth aspect of the present invention relates to a linear shaft motor having a magnetic shaft with a reduced height of the cross section, by which a slider construction height is reduced, a conventional magnetic shaft having a circular cross section. Said modified magnetic shaft has a symmetric cross-section, and may have an ellipse cross-section, or a circular cross-section with two flattened sections, or two a cross-section generated by two half-circles joined by straight lines. The coils are wound such as to get essentially the same cross-section while keeping the air gap. In this way the slider construction height Hh is reduced while maintaining the advantages of the LSM.

Other aspects, advantageous characteristics and embodiments are explained in the further description.

DRAWINGS

The invention and certain embodiments thereof will now be described, by way of example, and with reference to the accompanying drawings.

The figures show the following:

FIG. 1 a WEDM according to TWM505992U with LSM's;

FIG. 2 the main components of a LSM;

FIG. 3 a slider of a LSM according the invention;

FIG. 4 the motor housing;

Figure 7:
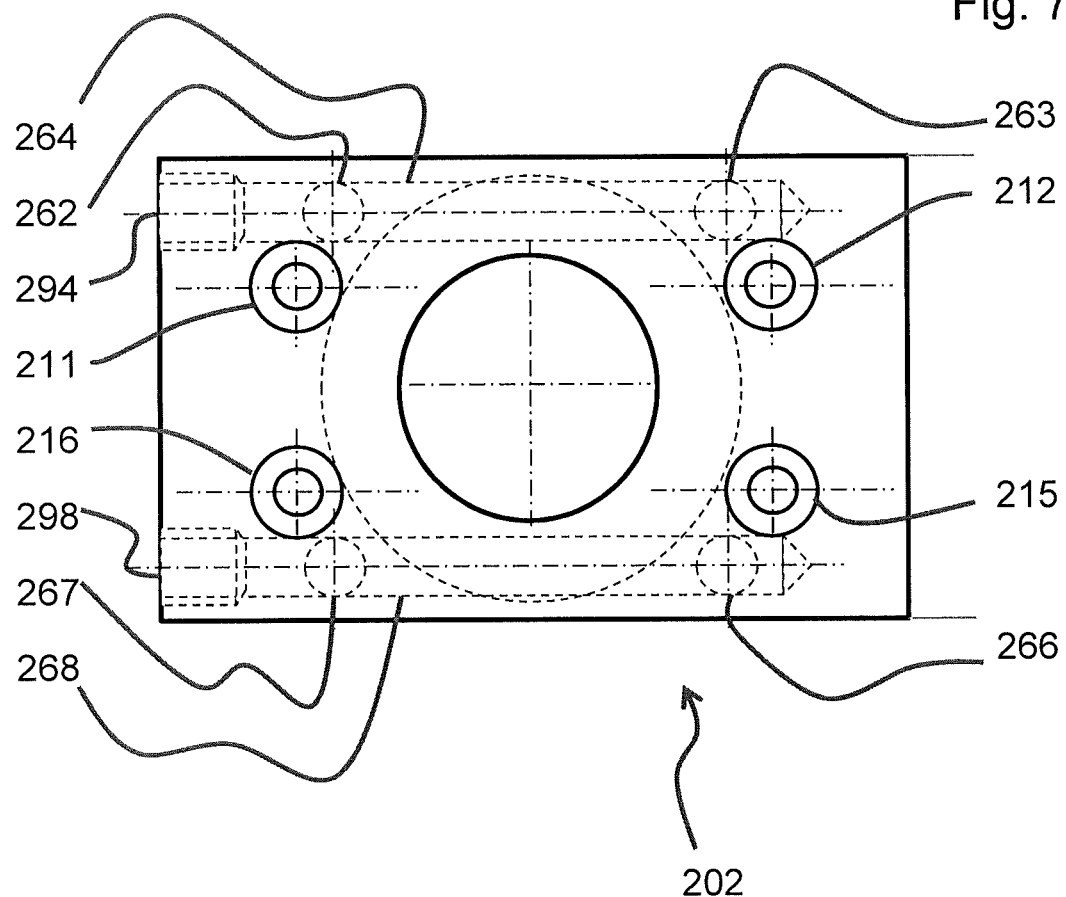
Figure 8:
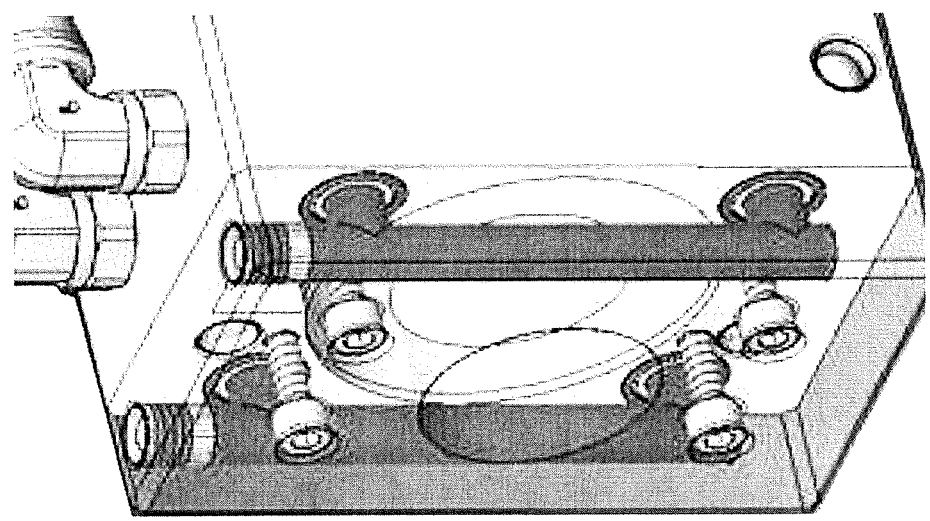
Figure 9:
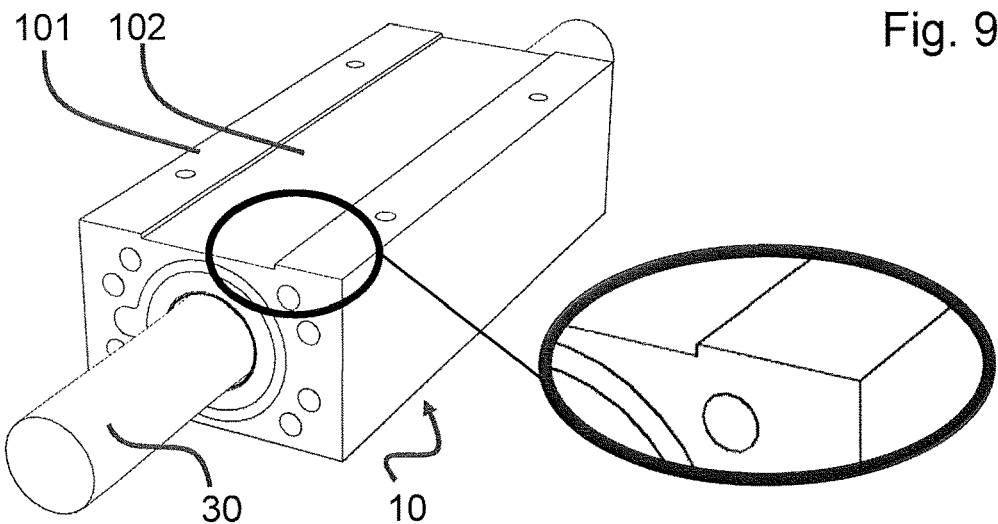
Figure 10:
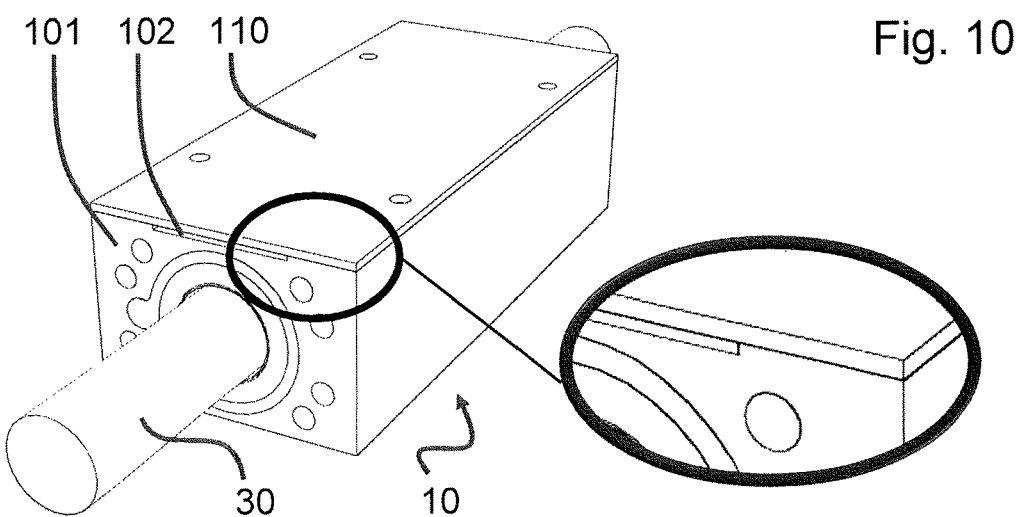
Figure 11:
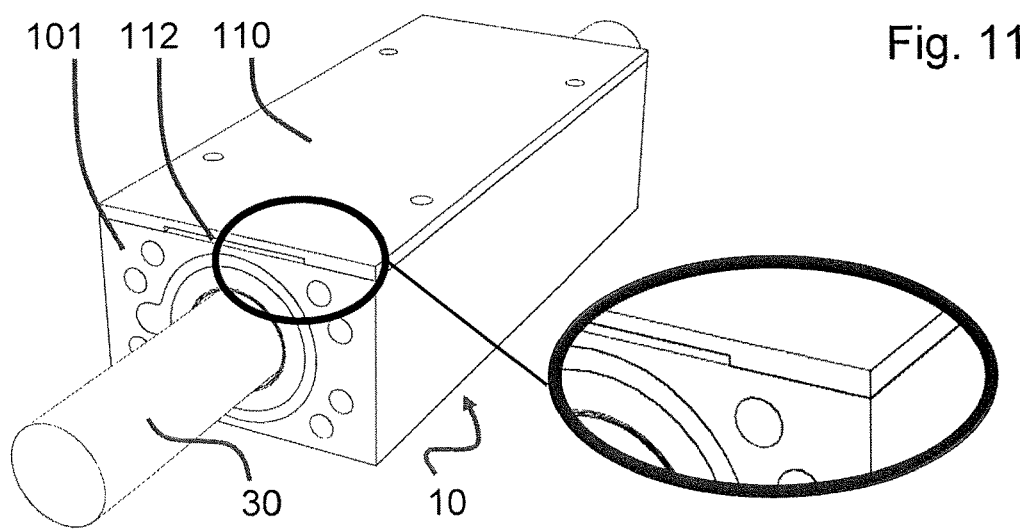
Figure 12:
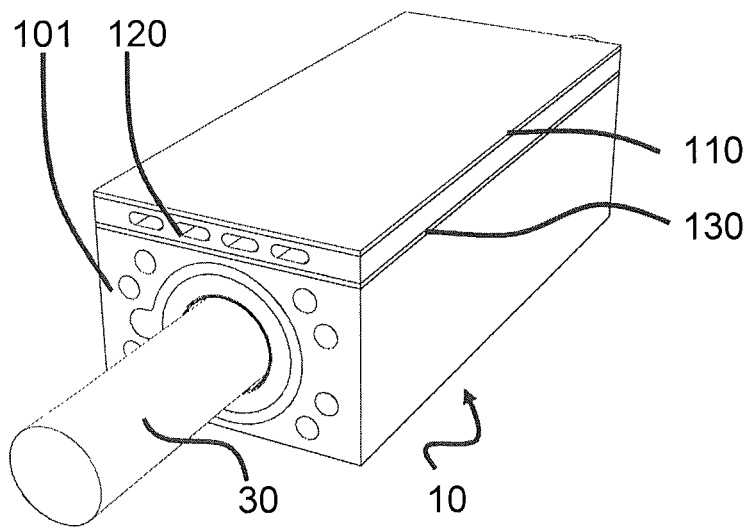
Figure 13:
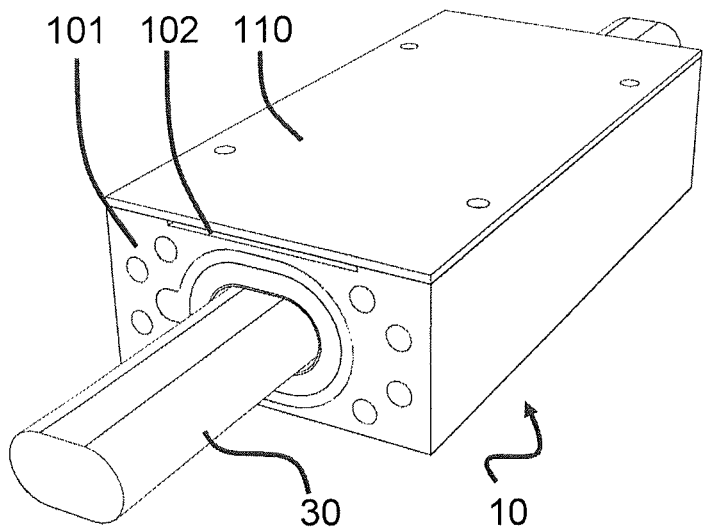
Figure 14:
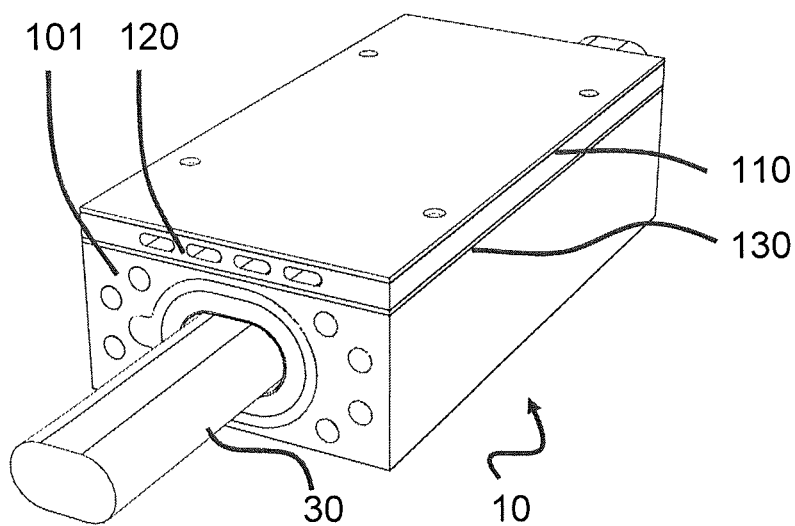
Figure 15:
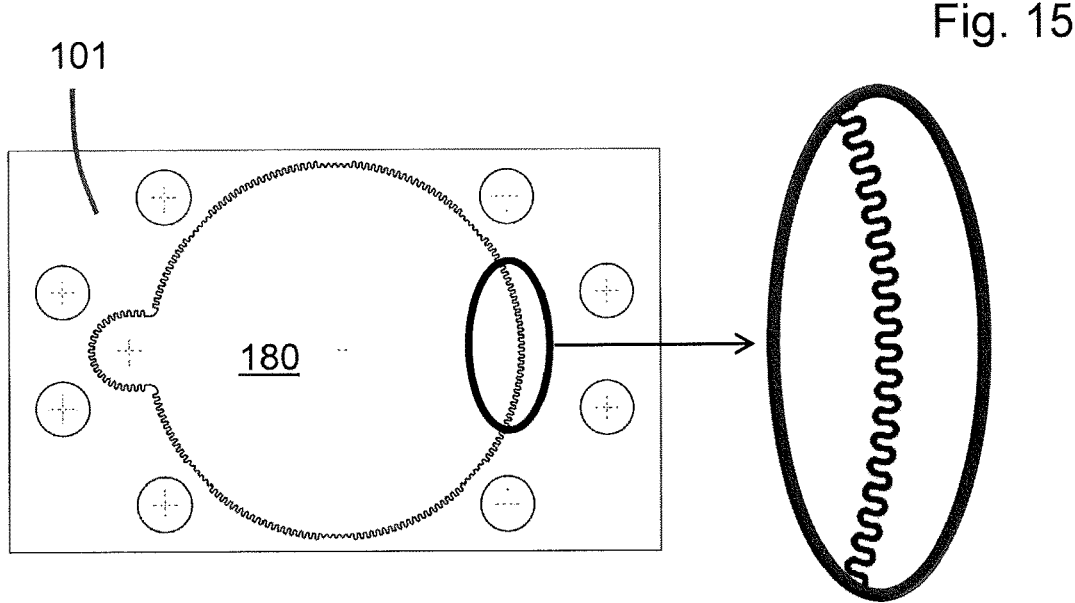
Figure 16:
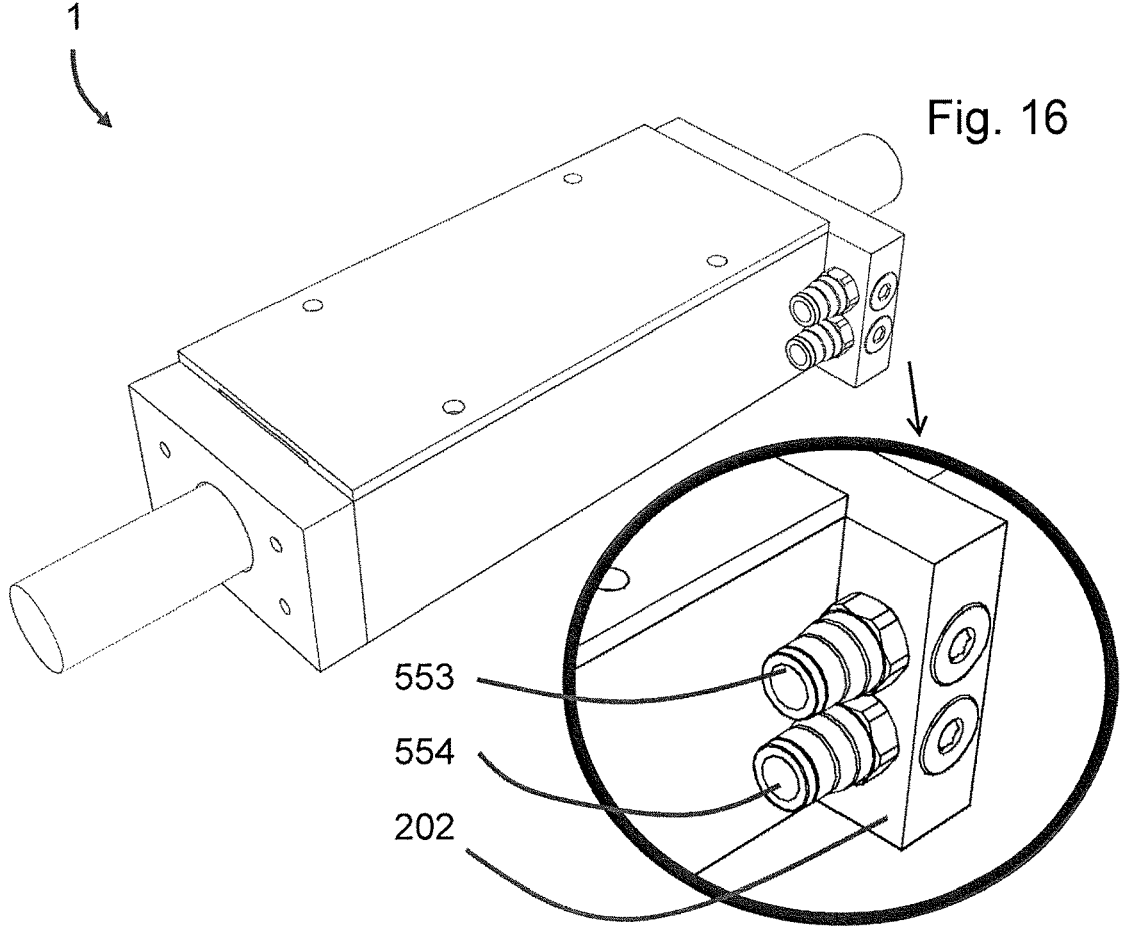
Figure 17:
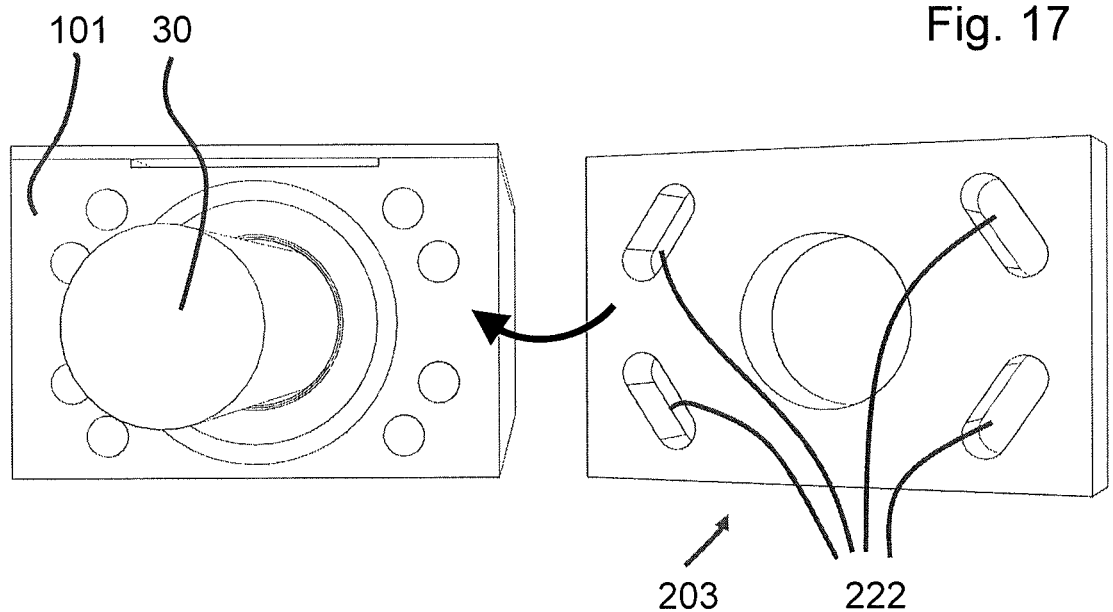

FIG. 7 a view of a flange of the slider;

FIG. 8 an partial isometric representation of a flange;

FIG. 9 an isometric representation of a LSM according the invention including additional elements for the thermal separation of slider and machine structure;

FIG. 10 an isometric representation of a LSM according the invention including additional elements for the thermal separation of slider and machine structure;

FIG. 11 an isometric representation of a LSM according the invention including additional elements for the thermal separation of slider and machine structure;

FIG. 12 an isometric representation of a LSM according the invention including additional elements for the thermal separation of slider and machine structure;

FIG. 13 an isometric representation of a LSM according the invention including additional elements for the thermal separation of slider and machine structure;

FIG. 14 an isometric representation of a LSM according the invention including additional elements for the thermal separation of slider and machine structure;

FIG. 15 a view of a motor housing with a detail of its central bore;

FIG. 16 an isometric representations of a LSM with a detail of its fluid cooling circuit;

FIG. 17 an partial isometric representation of a flange; and

Figure 18:
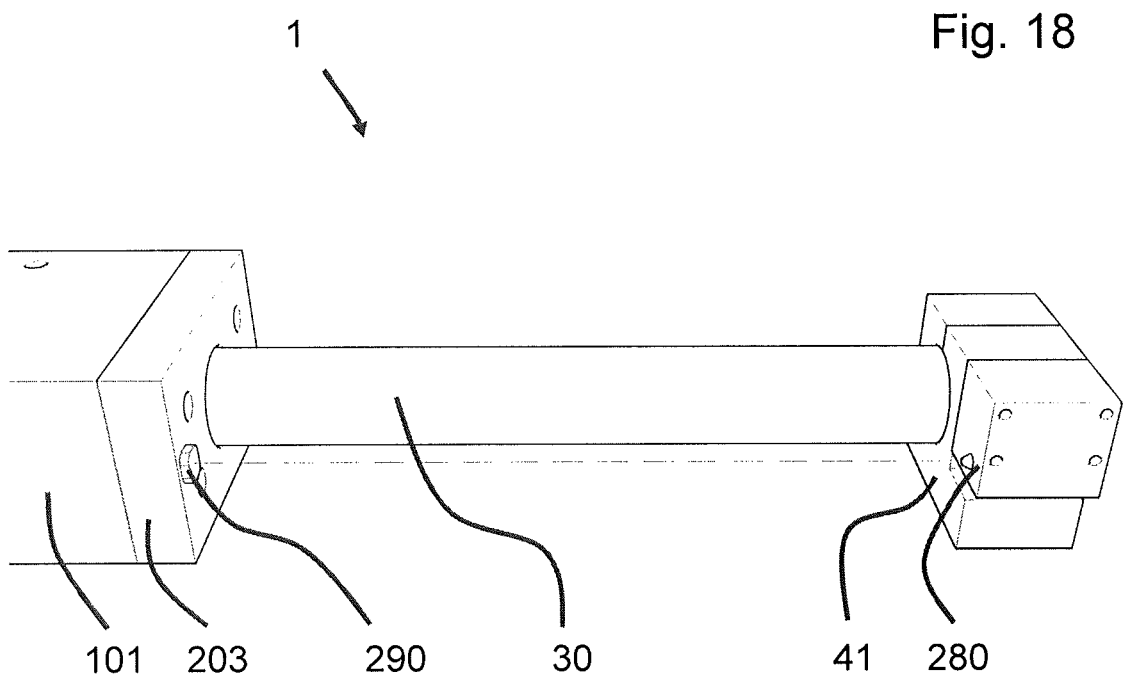

FIG. 18 a side view of a LSM including an integrated linear measuring system

DETAILED DESCRIPTION

Figure 1:
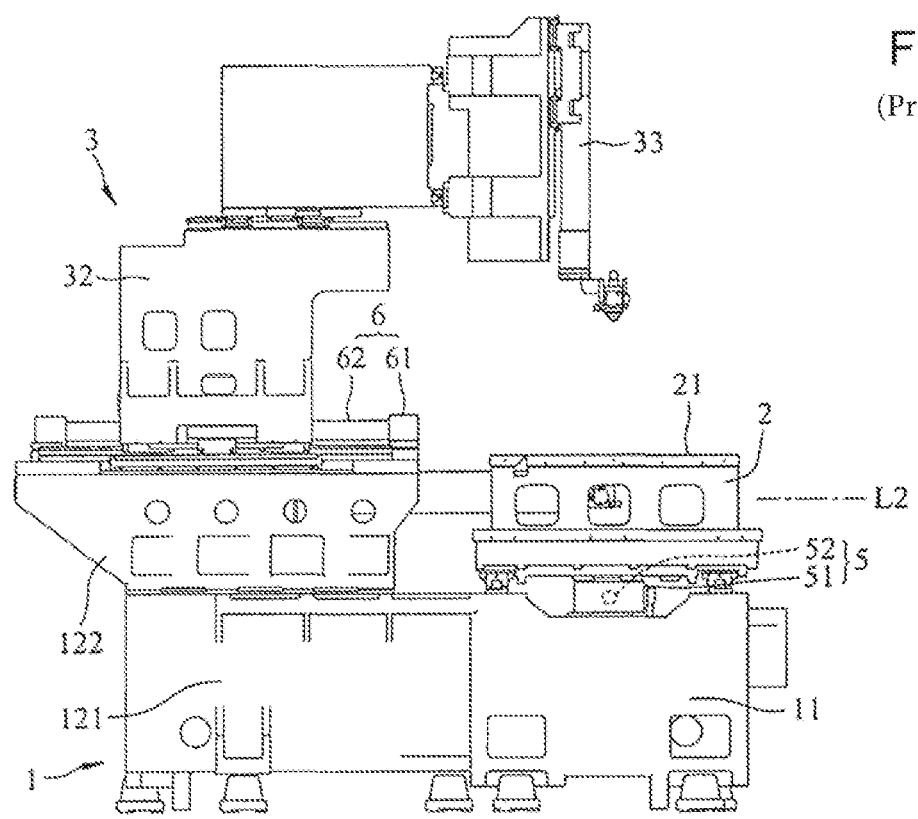

FIG. 1 is a side view of a state of the art wire electric discharge machine as illustrated in the document TWM505992U, having a so called T-bed. Reference number 5 is a linear shaft motor of the X-axis. Number 51 and 52 are respectively the slider and the magnetic shaft of the X-axis. Reference number 6 is a linear shaft motor of the Y-axis. Number 62 is the magnetic shaft of the Y-axis. In the illustrated case the magnetic shaft of the X and Y axis are attached to the bed by means of shaft supports, while the slider is attached to a moving part of the machine. The space available f.i. between the table and the bed is limited. The bed is shaped accordingly. The same problem occurs also with other axis layouts, and also with other machine tools.

Figure 2:
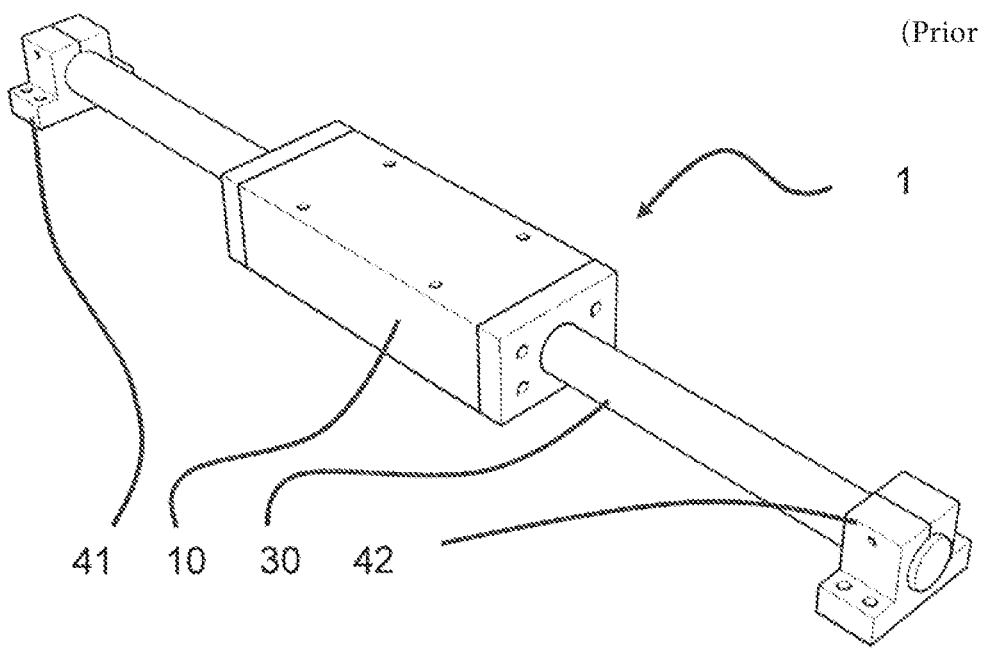

FIG. 2 is a simplified isometric representation of an LSM 1 with its main components, that is: a slider 10 (sometimes called: mover or forcer), a magnetic shaft 30, a pair of shaft supports 41 and 42. Slider and tubular magnetic shaft realize the relative motion with respect to each other; both parts can constitute the stationary or the moving part.

Figure 3:
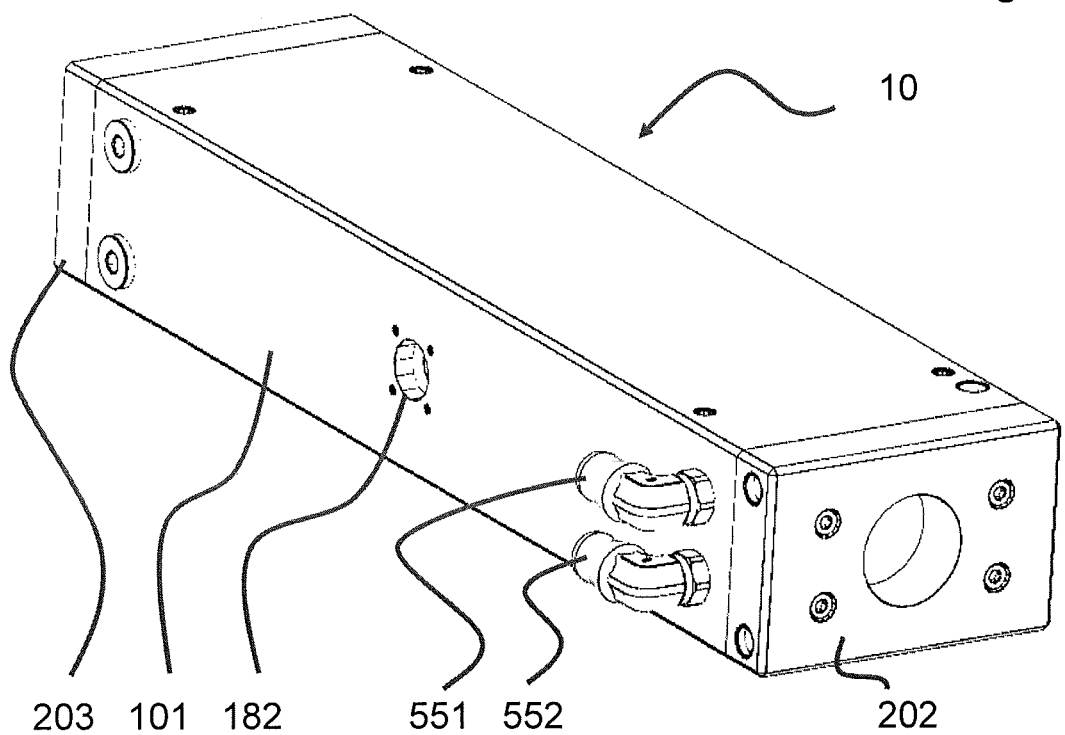

FIG. 3 is an isometric representation of the slider 10 of a LSM according the invention. The depicted components of the slider are: a motor housing 101, a first flange 202 and a second flange 203, and two elbow tube press fittings 551 (inlet) and 552 (outlet). The flanges 202, 203 are mounted against the motor housing by means of 4 screws. The slider 10 further comprises the resin embedded coils (not shown) and one or more electrical connectors (not shown) which are mounted on connector mounting hole 182 at the side of the slider. The flanges 202 and 203 have a central hole which is slightly larger than the magnetic shaft 30.

Figure 4:
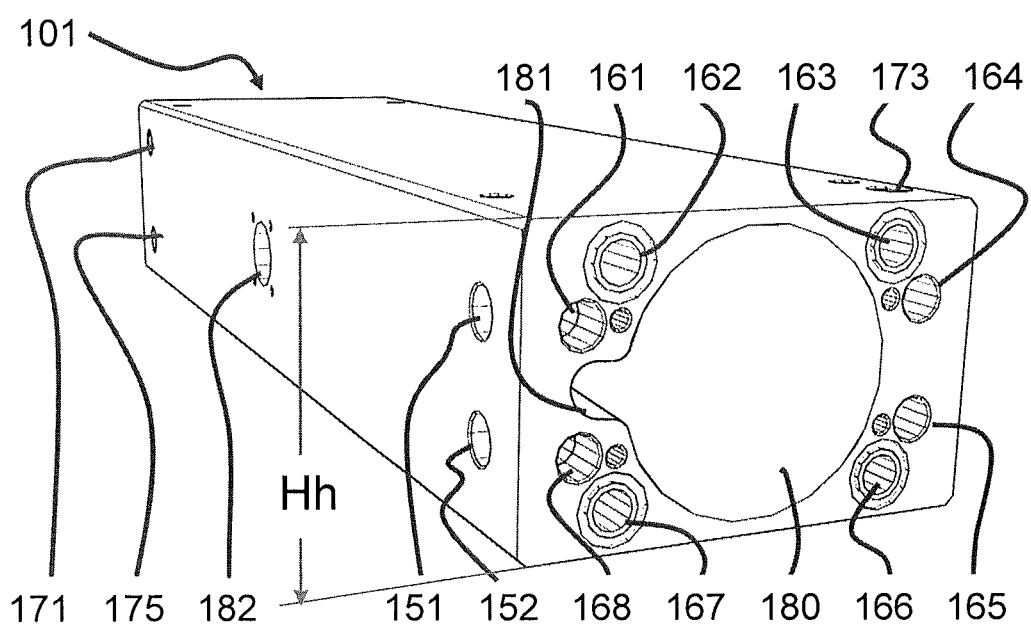

FIG. 4 is an isometric representation of motor housing 101. The motor housing 101 is monolithic oblong, mainly cuboid shaped, and has a low construction height Hh. The motor housing has a central bore 180 in which the substantially hollow-cylinder-shaped coils are accommodated, and a preferably rounded oblong cable channel 181 through which endings of the coils are routed to the terminals of the electrical connections.

The motor housing has a rectangular low height cross section, for instance 70 mm×110 mm.

The height Hh is essentially determined by external diameter of the coils. The residual material thickness in the region straight above and below the central bore 180 is of a few millimeters only, typically 2-6 mm. The length of the motor housing is determined by the number of coils.

The motor housing depicted here has eight longitudinal cooling holes which are distributed symmetrically, at the left side 161,162,167,168, and right side 163,164,165,166 of the central bore, and parallel thereto, and in such a way that these longitudinal cooling holes do not determine or substantially increase the overall height of the motor housing. This is achieved by locating the longitudinal cooling holes such that any central axis of said longitudinal cooling holes lays below the topmost portion of the central bore and/or above the lowermost portion of the central bore. In other words, the longitudinal cooling holes 162, 163 cannot be located higher than the central bore 180, and, the cooling holes 166, 167 cannot be located lower than the central bore 180.

Figure 5:
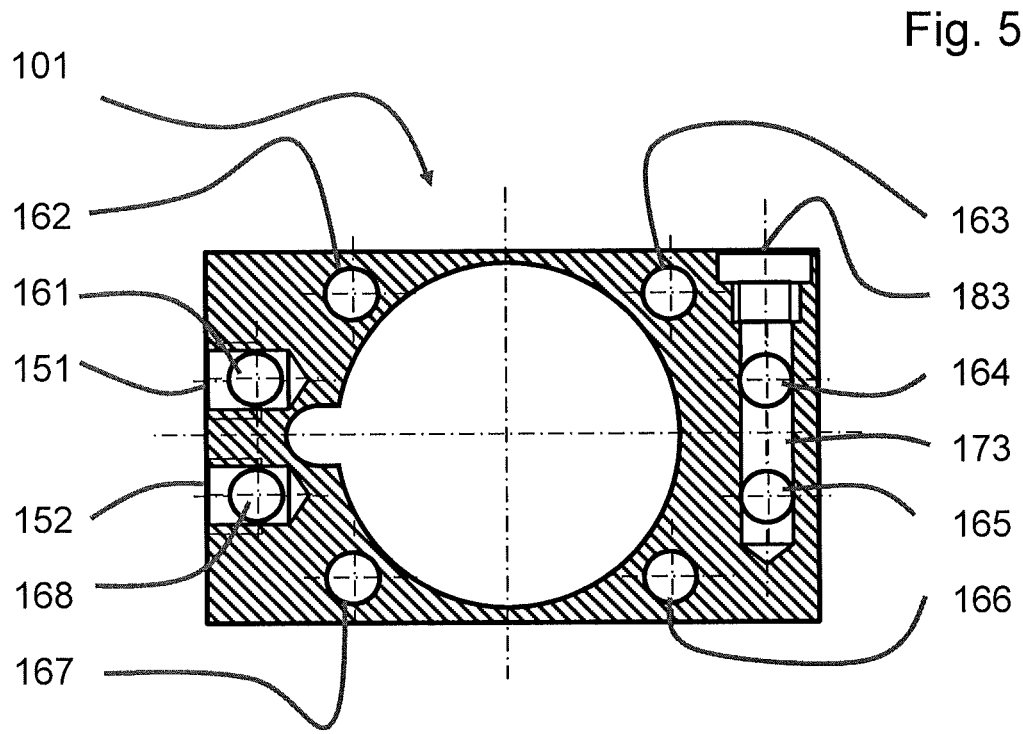
FIG. 5 is a cross-section of the motor housing.
Figure 6:
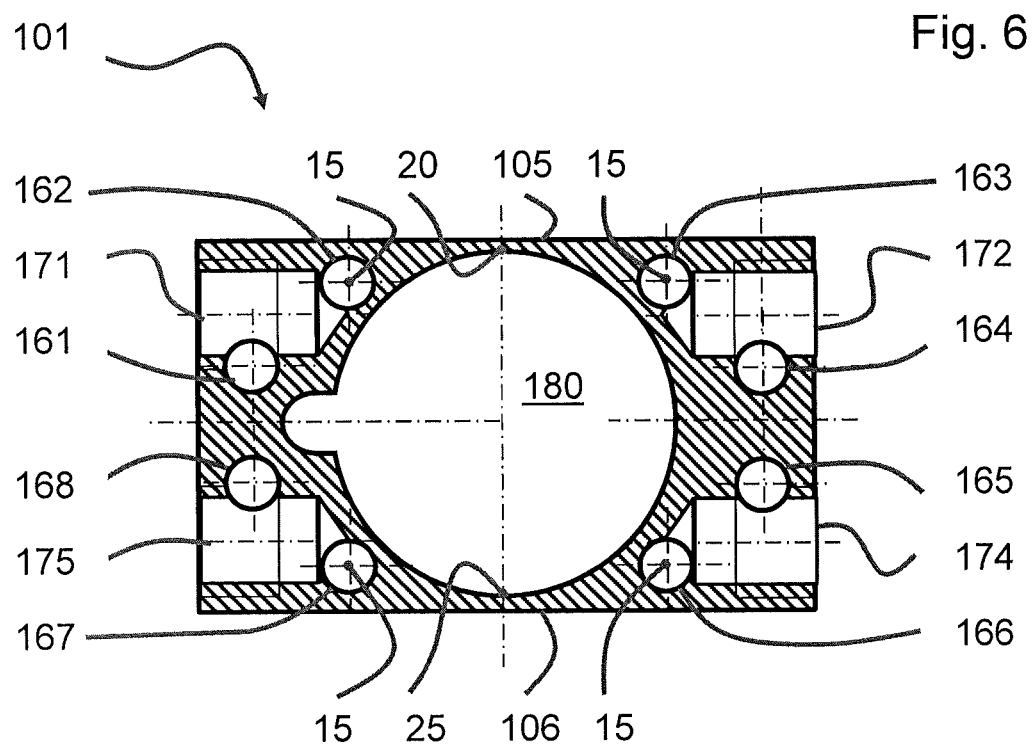
FIG. 6 is a cross-section of the motor housing.

The inlet 151 of the cooling circuit is connected with hole 161, and outlet 152 is connected with hole 168. Further a number of interconnection holes connect the these longitudinal cooling holes with each other to form a cooling circuit, as illustrated in FIGS. 5 and 6:

The horizontal blind hole 171 connects hole 161 with hole 162.

The horizontal blind hole 172 connects hole 163 with hole 164.

The vertical blind hole 173 connects hole 164 with hole 165.

The horizontal blind hole 174 connects hole 165 with hole 166.

The horizontal blind hole 175 connects hole 167 with hole 168.

FIG. 5 is a cross-section of the motor housing 101, across the inlet 151, outlet 152 and vertical interconnection hole 173. Interconnection hole 173 is closed by means of a threaded peg 183. The illustrated example comprises eight longitudinal cooling holes having circular cross section, however it may comprise two or more longitudinal cooling holes, and the shape could be other than circular, to promote the heat evacuation from the region above and below the central bore 180.

In an alternative embodiment the inlet 151, the outlet 152 and the vertical interconnection hole 173 are integrated in the flange 202 (see FIG. 16).

The alternative embodiment illustrated in FIG. 16 comprises a modified flange 202 as explained here above, whereas the modified flange 202 further comprises a portion protruding to the side, said protruding portion having an integrated fluid cooling circuit inlet and outlet parallel to the central bore 180. In this way straight tube press fittings 553, 554 can be used instead of the elbow tube press fittings.

In a minimalistic embodiment one or both flanges, respectively the portion of the fluid cooling circuit integrated in said flanges may be replaced by connection fittings mounted in correspondence of each longitudinal cooling holes and pipes to connect these holes to form the fluid cooling circuit.

FIG. 6 is a cross-section of the motor housing 101, across the interconnection holes 171, 172, 174 and 175. These horizontal interconnection holes are also closed by means of threaded pegs (not shown).

In an alternative embodiment as illustrated in FIG. 17 the interconnection holes 171, 172, 174 and 175 may be replaced by equivalent interconnection holes or apertures 222 integrated in the flange 203, the apertures 222 having a groove-shaped form and connecting two or eventually more longitudinal cooling holes.

In a combination of certain alternative embodiments described in the foregoing paragraphs, all interconnections and the inlet and outlet ports can be located in the flanges 202 and 203, so that the number of machining operations to be executed with the motor housing 101 after (typically) an extrusion process are minimized. In such combination the cooling is improved by encompassing the entire length of the motor housing 101 and the flanges 202 and 203 with the fluid cooling circuit.

FIG. 7 depicts some details of flange 202, in particular:
  two blind holes 262, 263 matching with the longitudinal cooling holes 162, 163 in the motor housing 101, and
  two blind holes 266, 267 matching with the longitudinal cooling holes 166, 167 in the motor housing 101, and
  a transversal hole 264 connecting hole 262 with hole 263, and
  a transversal hole 268 connecting hole 266 with hole 267.
The transversal holes 264 and 268 are closed by means of threaded pegs 294, 298.

As best shown in FIG. 7 the longitudinal cooling holes 162, 163, 166, 167 of the motor housing 101 have corresponding continuations 262, 263, 266, 267 in flange 202; said continuations being connected by the transversal holes 264, 268 to form a continuous passageway for the integrated fluid cooling circuit.

The motor housing is preferably made of aluminum, which is an excellent heat conductor. The motor housing profile is preferably obtained by extrusion. Preferably one or more internal and/or external feature of the profile are obtained by extrusion, such as the central bore 180, the cable channel 181, the longitudinal cooling holes 161-168, and/or an oblong recessed channel at the outer surface of the housing (shown in FIG. 9). The cross section of the longitudinal cooling holes is generally circular, however it can be optimized to follow the geometry of the central bore such as to improve heat flow to the cooling circuit.

The flanges 202 and 203 are made of an electrically insulating material, preferably a synthetic polymer, f.i. POM, or a composite material, f.i. an epoxy glass fabric. The flanges are preferably manufactured by means of one or more of the following processes: injection molding, milling, boring, or additive manufacturing.

FIG. 8 is a semitransparent isometric representation of the fluid passageway created within flange 202 by means of the before mentioned connecting holes 264, 268. Here one can see that the interconnection between the longitudinal cooling holes 162, 167 on the left side and the longitudinal cooling holes 163, 166 on right side of the motor housing 101 is made within the flange 202. From FIGS. 7 and 8 it is evident that, the integration of these transversal interconnection holes cannot be made within a motor housing having a low profile cross section as specified by the present invention, because they would interfere with the coils. Therefore the two sides of the motor housing are interconnected by means of interconnecting holes laying essentially transverse with respect to the longitudinal cooling holes of the motor housing, said interconnecting holes being located in one of the flanges.

The invention is implemented with a tubular shaft motor having a magnetic shaft, for instance an ironless linear synchronous motor. In this type of motor the heat is generated in the copper windings of the coils, due the resistive losses. The invention is also applicable to other tubular shaft motors, such as iron core motors, in which the heat is generated also in the iron due to the eddy currents. The coils are positioned in a row in a central bore of the motor housing and fixed by means of epoxide resin. The coils must be as close as possible to the permanent magnets of the shaft for best efficiency in terms of trust. Since the arrangement of the magnetic shaft and coils is more or less unchangeable, the other features of the slider must be arranged around these core parts. A cooling circuit must be placed as close as possible to the heat source, but it must not interfere with the windings. Integrating a cooling circuit all around the central bore would substantially increase the construction height of the motor housing. In contrast the cooling circuit according the invention provides effective cooling while maintaining a compact construction.

In operation the coils may reach a temperature of about 80° C., but peak temperature can be much higher. By continuously cooling the motor housing the LMS higher currents can be supplied, providing much more trust. To maintain the desired accuracy the temperature difference of the cooling fluid, between inlet and outlet should be limited, preferably to less than 1° C. This means that the fluid circulation must be considerable.

In case of EDM machines the dielectric fluid, i.e. the processing fluid may be used as a coolant for the cooling circuit of the LMS. Said dielectric fluid is either deionized (DI) water or oil; in both cases the cooling circuit must be constituted such as not to be damaged by corrosion, dissolution, or else. In any case the motor housing preferably comprises one of the following surface treatments: anodization, cataphoresis or surface coating.

As mentioned the coils are cast in the central bore 180 by means of an epoxide resin. The copper windings have low electrical and thermal resistance while the resin is a good insulator. The aluminum motor housing 101 envelops the resin epoxide casted coils, with a comparably thick resin layer to ensure electrical insulation. Heat flows from the resin embedded coils to the longitudinal cooling holes. The aluminum is a very good heat conductor, thus the motor housing 101 assumes a nearly uniform temperature and the heat is evacuated very effectively by means of the fluid cooling circuit.

However due to the reduced profile, the cooling at the central portion of the motor housing, straight above and below the central bore 180 is slightly less effective.

The FIGS. 9 to 14 are isometric representations of a LSM according the invention (the flanges are not shown) illustrating additional elements for the thermal separation of slider and machine structure.

To minimize the effect of the oblong hotspot and to avoid any adverse effect to the structural components, the motor housing 101 may comprise an recessed channel 102 at the outer surface of the housing, straight above and/or below the central bore 180, as illustrated in FIG. 9. Preferably said recessed channel 102 has a small depth of 0.1 to 5 mm, more preferably 0.3 to 1 mm, and may be produced directly by extrusion. In this way a direct heat transfer between the solid motor housing 101 and solid structural components of the machine is avoided.

As known in the art the slider and the structural components of the machine may be separated further by adding a thermal insulating layer such as an insulating pad 110 or a plurality of insulating spacers between the mounting surfaces. Said insulating layer may be for instance a composite material. Said insulating layer may cover the entire area between motor and structural components or only the contacting area. A thin pad of few mm provides a substantial improvement of the thermal resistance, with no substantial loss of space. Preferably, the two elements mentioned here above, i.e. the insertion of a recessed channel 102 and the addition of an insulating pad 110 are combined as illustrated in FIG. 10. Obviously the recessed channel 102 may also be arranged in the insulating pad 110, as illustrated in FIG. 11.

FIG. 12 illustrates another embodiment of the invention, with an insulating pad 130, a cooling plate 120, and a second insulating pad 110 inserted between the slider 10 and the machine structure (not shown). In such an embodiment the machine structure is effectively protected from a heat immission by the LSM, because the modest residual heat which has not been captured in the primary cooling circuit is now evacuated in a secondary cooling circuit integrated in the plate 120. In a further preferred embodiment, the cooling circuits of the plate 120 and of the slider 10 may be connected with each other in series, whereas the temperature controlled cooling fluid is for example first supplied to the secondary cooling circuit in the plate 120 and subsequently to the primary cooling circuit in the slider 10.

The FIGS. 13 and 14 show another embodiment of the invention, in which the height of slider 10 is further reduced. The magnetic shaft of a conventional LSM has a circular cross section. In contrast hereto the present embodiments in the FIGS. 13 and 14 show a linear shaft motor in which the magnetic shaft 30 has a reduced height of the cross section. Said modified magnetic shaft has a symmetric cross-section, for instance an ellipse cross-section, or a circular cross-section with two flattened sections, or a cross-section generated by two half-circles joined by straight lines. The perimeter of the cross section of the magnetic shaft determines the thrust. Thus a magnetic shaft having f.i. an elliptic cross section has the same thrust of a magnetic shaft of same cross section perimeter having a circular cross section. The coils are in such embodiments wound accordingly, such to get essentially the same cross-section while keeping the necessary air gap to the magnetic shaft. In this way the slider construction height Hh is further reduced while maintaining the advantages of the inventive LSM. In this embodiment the oblong hotspot straight above and/or below the central bore is more pronounced, thus it is preferable to include one or more of the elements illustrated in conjunction with FIGS. 9 to 12, that is: a recessed channel, an insulation pad and/or a cooling plate.

FIG. 15 illustrates a detail of the motor housing 101, in which the surface of the central bore 180 is knurled or otherwise machined at the interfacing surface between the motor housing 101 and the resin used to embed the coils. In this way the heat surface for heat transfer is increased and heat evacuation is improved.

According to the foregoing embodiments the fluid cooling circuit of the inventive LSM slider ends at an outlet, which is then connected to the fluid cooling circuit of the machine tool. In an alternative embodiment the fluid cooling circuit of the slider is extended by forming a passageway for the fluid exiting from the last longitudinal cooling hole to a circular cavity in the flange 202 (not shown), by which the fluid is conducted in the gap between the magnetic shaft and the motor coils, and across said gap to the other flange 203. Here the fluid is collected in a circular cavity in flange 203 and led to an outlet. Here the flanges 202 and 203 comprise a seal to avoid or reduce the loss of cooling fluid. Leakage fluid is conducted to a collecting tank by suitable ducts.

As shown in FIG. 2 the linear shaft motor comprises two supports 41, 42 holding the magnetic shaft 30 in place. In a further preferred embodiment of the present invention, a linear measuring system is installed between one of the flanges 202, 203 and one of the supports 41, 42. Preferably said linear measuring system is a laser interferometry system, as illustrated in FIG. 18. The components of said linear measuring system are: a laser source 280 and a photodetector which are preferably mounted or integrated in one of the supports 41 or 42, and a mirror 290 which is preferably mounted or integrated in the flange 202 or 203 of the slider.

In summary, the linear shaft motor according the invention is applicable with high precision positioning systems as used with machine tools, such as electric discharge machines, laser processing machines, additive manufacturing machines, etc. The LMS according the invention distinguishes itself by the compact size, in particular the low construction height, and the full integration of a fluid cooling circuit.

Lastly, a LSM motor housing according the invention can be achieved by mounting a jacket type housing around a preassembled coil assembly. This may be achieved for instance: by a fork type constitution of the jacket type housing having a horizontal slit over the entire length; or, a horizontally split two parts jacket type housing, the two halves forming a clamp around the coil assembly and being completed with the flanges.

The foregoing description illustrates many different embodiments and variants by which the inventive linear shaft motor can be realized. It goes without saying, that other variants and combinations of the invention not specifically contemplated herein are part of the inventive idea and may be easily deductible and applied by the person skilled in the art.

The present invention is not limited to the explicitly explained examples and embodiments. The illustrated alternatives are rather to be considered suggestions intended to motivate the person skilled in the art to implement the invention in a most favorable way. It shall be emphasized that some of the features and embodiments described in combination in the foregoing text can also be claimed separately.

REFERENCES

1 linear shaft motor, or LSM (also: Magnetic Shaft motor)
30 tubular magnetic shaft, or Shaft
32 permanent magnets
41,42 shaft supports
10 slider, (also: motor slider, mover, forcer)
15 axis of longitudinal cooling holes
20 topmost portion of the central bore
25 lowermost portion of the central bore
101 motor housing, or housing (part of the slider)
102 oblong recessed channel
105 top surface of the motor housing
106 bottom surface of the motor housing
110, 130 thermal insulating pad
120 cooling plate (secondary cooling)
180 central bore
181 cable channel
182 connector mounting hole
161-168 longitudinal cooling holes
171-175 fluid circuit interconnection holes
222 fluid circuit interconnection apertures
262-268 fluid circuit interconnection holes in flange 202
280 laser source of linear measuring system
290 mirror of linear measuring system
151, 152 Inlet, outlet
551, 552 fittings (Push-in)
553, 554 straight tube press fittings
183 threaded peg
294, 298 threaded pegs
202, 203 motor housing flanges, or flanges
Hh Height of the housing cross-section

What is claimed is:

1. A linear shaft motor comprising a slider and a tubular magnetic shaft, whereas the slider comprises an oblong cuboid shaped motor housing having a rectangular cross-section with the broader surfaces forming the bottom surface and top surface of the motor housing and the narrower surfaces forming the lateral surfaces of the motor housing, the bottom and top surfaces being greater in length than the lateral surfaces, one of the broader surfaces being configured to be mounted to a machine tool, whereas the slider further includes an integrated closed looped cooling circuit for circulating a cooling liquid therein, and whereas the motor housing includes longitudinal central bore in which a row of coils are located, wherein, the motor housing comprises at least two longitudinal cooling holes which are a part of the integrated closed loop cooling circuit, said at least two longitudinal cooling holes being distributed symmetrically at a left and at a right side of the central bore and parallel thereto, all of the longitudinal cooling holes being distributed within the motor housing so that the central axes of all of the longitudinal cooling holes lay below the topmost portion of the central bore and above the lowermost portion of the central bore.

2. The linear shaft motor according to claim 1, wherein the slider comprises a first flange at one end of the motor housing and a second flange at the other end of the motor housing, whereas at least one of said flanges comprises a section of the integrated fluid cooling circuit.

3. The linear shaft motor according to claim 2, wherein one of said at least one of said flanges comprises at least one interconnecting hole arranged preferably transverse with respect to the at least two longitudinal cooling holes of the motor housing.

4. The linear shaft motor according to claim 1, wherein the motor housing comprises at least one interconnecting hole connecting the at least two longitudinal cooling holes, whereas the at least one interconnecting hole is preferably laying transverse with respect to the least two longitudinal cooling holes of the motor housing.

5. The linear shaft motor according to claim 1, wherein, the longitudinal cooling holes of the motor housing, the interconnecting holes of the motor housing and the at least one interconnecting holes of the at least one flange form a continuous passageway of the integrated fluid cooling circuit.

6. The linear shaft motor according to claim 1, wherein the integrated fluid cooling circuit includes at least one inlet fitting and at least one outlet fitting, whereas the at least one inlet fitting and at least one outlet fitting are located at one lateral surface of the motor housing or on a surface of the flanges.

7. The linear shaft motor according to claim 1, wherein the motor housing is made of aluminum or an aluminum alloy, preferably the motor housing is obtained by an extrusion process.

8. The linear shaft motor according to claim 1, wherein the longitudinal cooling holes and the interconnecting holes of the motor housing are protected against corrosion, preferably by one of the following surface treatments:
   anodization; or
   cataphoresis; or
   surface coating.

9. The linear shaft motor according to claim 1, wherein the flanges are made of an electrically insulating material, preferably the flanges are produced by at least one of the following manufacturing processes: injection molding, milling; boring or additive manufacturing.

10. The linear shaft motor according to claim 1, wherein the motor housing comprises an oblong recessed channel at its top surface and/or at its bottom surface, preferably the oblong recessed channel is allocated above and/or below the central bore.

11. The linear shaft motor according to claim 1, wherein the tubular magnetic shaft has one of the following cross-sections:
    circular
    ellipsoidal
    circular, with two flattened sections, or
    two half-circles joined by straight lines.

12. The linear shaft motor according to claim 1, wherein all interconnection holes connecting the longitudinal cooling holes of the motor housing, and the inlet and the outlet of the integrated fluid cooling circuit are incorporated in the flanges.

13. The linear shaft motor according to claim 1, wherein the first flange comprises a portion protruding from the lateral surface of the motor housing, said protruding portion comprising the inlet and the outlet of the integrated fluid cooling circuit.

14. The linear shaft motor according to claim 1, further comprising a first- and a second support for the magnetic shaft, wherein it further comprises a linear measuring system, and that one of the supports and one of the flanges comprises a component of said linear measuring system.

15. A machine tool with a linear shaft motor according to claim 1, wherein the slider is mounted to a structural component of the machine tool, preferably the structural component and the slider are at least partially separated by a thermal insulating pad.

* * * * *